United States Patent
Czarnecki et al.

(10) Patent No.: US 6,609,056 B1
(45) Date of Patent: Aug. 19, 2003

(54) ADAPTIVE LOAD TORQUE FOR GEAR SELECTION IN AN AUTOMATIC TRANSMISSION

(75) Inventors: Edward W Czarnecki, Pearson, MI (US); Howard L Benford, Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 50 days.

(21) Appl. No.: 10/076,509

(22) Filed: Feb. 15, 2002

(51) Int. Cl.[7] .................................................. G06F 7/00
(52) U.S. Cl. ........................... 701/51; 701/84; 701/87; 477/110; 477/115
(58) Field of Search ................................ 701/51, 54, 55, 701/84, 87; 180/337; 477/34, 110, 115

(56) References Cited

U.S. PATENT DOCUMENTS

| | | | |
|---|---|---|---|
| 4,875,391 A | 10/1989 | Leising et al. | |
| 4,905,545 A | 3/1990 | Leising et al. | |
| 4,951,200 A | 8/1990 | Leising et al. | |
| 5,074,371 A | 12/1991 | Shibayama | |
| 5,088,351 A | 2/1992 | Miyake et al. | |
| 5,293,789 A * | 3/1994 | Goto et al. | 477/151 |
| 5,390,116 A | 2/1995 | Hayafune | |
| 5,428,531 A | 6/1995 | Hayafune | |
| 5,475,591 A | 12/1995 | Suzuki et al. | |
| 5,498,195 A | 3/1996 | White et al. | |
| 5,557,519 A | 9/1996 | Morita | |
| 5,558,598 A | 9/1996 | Torimoto | |
| 5,669,850 A | 9/1997 | Dourra et al. | |
| 5,685,801 A | 11/1997 | Benford et al. | |
| 5,778,331 A | 7/1998 | Leising et al. | |
| 6,019,703 A | 2/2000 | Black et al. | |
| 6,090,012 A | 7/2000 | Hollingsworth et al. | |
| 6,170,623 B1 * | 1/2001 | Eismann et al. | 192/3.55 |
| 6,231,477 B1 | 5/2001 | Hollingsworth et al. | |
| 6,352,146 B1 * | 3/2002 | Eismann et al. | 192/3.58 |
| 6,418,365 B1 * | 7/2002 | Loffler et al. | 701/51 |

* cited by examiner

Primary Examiner—William A. Cuchlinski, Jr.
Assistant Examiner—Olga Hernandez
(74) Attorney, Agent, or Firm—Ralph E. Smith

(57) ABSTRACT

A method of controlling an automatic transmission of a motor vehicle operating in a automatic speed control speed mode is provided. The first step in the method is measuring the torque output of the engine. A torque load acting on the transmission in a first gear is then determined. A maximum torque capable of being produced by the engine is then predicted. A torque output of the transmission in a second gear is then determined based upon the predicted maximum torque capable of being produced by the engine. A transmission shift from the first gear to the second gear is then allowed if the determined torque output of the transmission in the second gear is greater than the torque load of the transmission in a first gear.

5 Claims, 3 Drawing Sheets

ADAPTIVE LOAD TORQUE FOR GEAR SELECTION IN AN AUTOMATIC TRANSMISSION

FIELD OF THE INVENTION

The present invention relates to an automotive vehicle cruise control system and, more particularly, to a method of controlling vehicle speed with improved gear shifting for an automatic transmission.

BACKGROUND OF THE INVENTION

Automotive vehicles generally incorporate a motive force system having three basic components: an engine, a drivetrain and drive wheels. The engine produces force by converting chemical energy from a liquid fuel into the mechanical energy of motion. The drivetrain transmits the resultant force of this kinetic energy to the wheels which frictionally contact a surface for moving the vehicle. The main component of the drivetrain is the transmission, which transmits engine torque over a relatively limited angular speed range to the wheels over a broader speed range, in accordance with the tractive-power demand of the vehicle. The transmission also controls the direction of rotation applied to the wheels so that the vehicle may be driven both forward and backward.

One advanced type of transmission is a multiple speed electronically controlled automatic transmission with overdrive. Examples of this type of electronically controlled automatic transmission are described in U.S. Pat. No. 4,875,391, entitled "An Electronically-Controlled, Adaptive Automatic Transmission System", issued on Oct. 24, 1989 to Leising et al.; U.S. Pat. No. 4,905,545, entitled "Method of Controlling the Speed Change of a Kickdown Shift for an Electronic Transmission System", issued on Mar. 6, 1990 to Leising et al.; U.S. Pat. No. 4,951,200, entitled "Method of Controlling the Apply Element During a Kickdown Shift for an Electronic Automatic Transmission System", issued on Aug. 21, 1990 to Leising et al.; and U.S. Pat. No. 5,669,850, entitled "Shift Hunting Prevention For An Automatic Transmission", issued to Dourra et al. These patents are owned by the Assignee of the present application and are incorporated herein by reference. However, it should be appreciated that the principles of the present invention are not limited to any particular automatic transmission, and that the present invention may be applied to a wide variety of other powertrain configurations.

A vehicle is generally equipped with an electronic engine control system for controlling the operation of the engine and drivetrain of the vehicle. The electronic control system includes a microcomputer-based transmission control module capable of receiving and monitoring input signals indicative of various vehicle operating conditions such as engine speed, torque converter turbine speed, vehicle output speed, throttle angle position, brake application, hydraulic pressures, a driver selected gear or operating condition (PRNODDL), engine coolant temperature and/or the ambient air temperature. Based on the information contained in the monitored signals, the controller generates command or control signals for causing actuation of solenoid-actuated valves to regulate the application and release of fluid pressure to and from apply cavities of clutches or frictional elements of the transmission. Accordingly, the controller is typically programmed to execute predetermined shift schedules stored in memory of the controller through appropriate command signals to the solenoid-actuated valves.

In addition to controlling the vehicle operation based on a manual operator throttle input, a large number of today's vehicles are also equipped with a cruise control system for allowing automatic speed control of the vehicle. The conventional cruise control system generally includes an operator input for selecting a desired setpoint speed, an operator input for incrementally increasing and/or decreasing the desired setpoint speed and a resume speed control input to resume cruise control operation with a previously selected setpoint speed. As is commonly known, the basic cruise control system operates to control the engine throttle position so as to attempt to continually maintain the vehicle speed at or near the desired setpoint speed.

With vehicles equipped with an automatic transmission, the cruise control system may cause various repetitive and cyclical up-shifting and downshifting of the automatic transmission as the transmission controller follows the predetermined shift schedules that are generally programmed in memory. For example, when traveling uphill, especially uphill on a steep incline, the transmission controller may up-shift and downshift between gears several times in order to maintain the vehicle speed at or near the desired setpoint speed. Cyclical up-shifting and downshifting of the transmission to maintain a speed setpoint can lead to a "shift hunting" condition. Repeated up-shifts and downshifts in turn affect the overall sound and feel of the vehicle which can be noticeable to the driver and passengers. In addition, the individual up-shifts or downshifts of the conventional automatic transmission can cause a sudden momentary increase or decrease in acceleration in an abrupt manner, especially when such changes cause large engine speed changes.

In conventional cruise control systems, many factors are considered in the methodology for determining when a shift between a first and a second gear is desirable. For example, the speed of the vehicle, throttle angle and manifold air pressure are compared to a set of predetermined setpoints to determine if an up-shift is feasible. These setpoints, typically derived from testing, do not account for variations in the loads acting on the vehicle such as changes in road topography, road surface, aerodynamics, or other loads acting on the engine such as increased electrical load, change in operation of an air-conditioning compressor or change in fuel quality. These changes, while directly affecting the performance of the engine, are not inherently easy to measure and thus do not allow for relatively easy monitoring of the performance of the engine.

It is therefore desirable to monitor the output performance of the engine in a real time basis to accurately show the output of the engine for use in cruise control operation. Additionally, it is desirable to predict the maximum output of the engine for use in determining cruise control operation. Furthermore, it is desirable to combine the current real time engine output performance and predicted engine output performance to accurately determine the current loads acting on the vehicle or engine which would preclude an engine up-shift.

SUMMARY OF THE INVENTION

To achieve the foregoing objectives, the present invention provides an interactive cruise control system and automatic transmission for a vehicle with improved shifting of the automatic transmission. The automatic system and method controls gear shifts of the transmission so as to prevent the occurrence of shift hunting. With the transmission engaged in a first gear, the output torque required to maintain a predetermined speed in the first gear is determined and a maximum output torque available in an up-shift condition to a second gear is predicted. An up-shift from the first gear to the second gear is inhibited when the predicted maximum output torque available in the second gear is less than the determined output torque required to maintain the predetermined speed in the first gear. An up-shift is allowed once the determined maximum output torque available in the second gear exceeds the output determined torque required to maintain the predetermined speed in the first gear.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
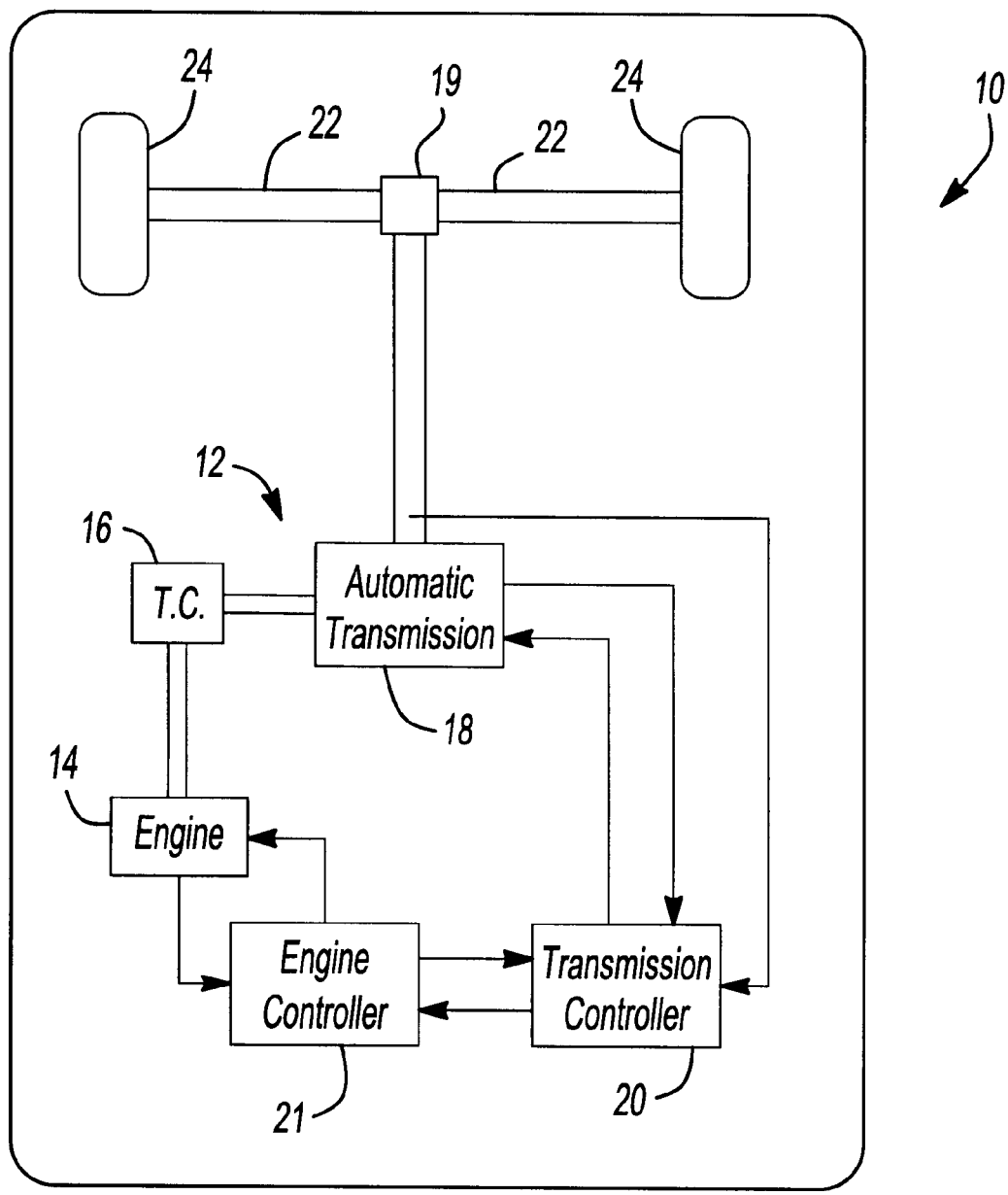
FIG. 1 is a diagrammatic view of a vehicle with an automatic transmission and apparatus for controlling the gear selection in the automatic transmission, according to an embodiment of the present invention.

Referring to FIG. 1, a vehicle powertrain system 12 according to the present invention is illustrated for a motor vehicle, generally shown at 10. The powertrain system 12 includes a heat engine 14 operating on a hydrocarbon based or fossil fuel.

The powertrain system 12 also includes a torque converter 16, as is known in the art, for operably interconnecting engine 14 and automatic transmission 18. The torque converter 16 changes the torque speed between the engine 14 and automatic transmission 18.

Automatic transmission 18 connects to engine 14 through torque converter 16 and transmits engine rotation and power at various ratios to a pair of drive wheels 24 of the motor vehicle. Thus, automatic transmission 18 enables the motor vehicle 10 to accelerate through predetermined gear ratios, while engine 14 functions within a predetermined operating range. It should be appreciated that a preferred embodiment, transmission 18 is a four or five-speed automatic transmission, as is well known in the art. Automatic transmission 18 drives a differential unit 19. Differential unit 19 engages a pair of axle shafts 22 which are operably connected to the pair of drive wheels 24.

The powertrain system 12 also includes a transmission controller 20, such as an electronic control unit. Transmission controller 20 enables electronic control of automatic transmission 18 to enable various ratios to be utilized in driving the drive wheels 24. In order to generate such control, transmission controller 20 receives input signals from engine 14 or an engine controller 21. Examples of such information received from engine controller 21 include vehicle speed, engine speed (rpm), engine torque, or the like. Similarly, transmission controller 20 generates output signals to control automatic transmission 18, and also outputs diagnostic and other communication signals to engine 14 and/or engine controller 21. Transmission controller 20 may also receive other vehicle condition signals depending on a particular configuration of the transmission 18. It should be noted that the above description of a powertrain system is merely exemplary and that the method of controlling the gear shifting is not intended to be limited by the exemplary powertrain system.

Additionally, as is well known in the art, the output torque and power of an engine may be affected by many factors. Some of the factors are loads that cause a change in the automatic transmission or the engine itself. These loads may include, but are not limited to, increased electrical loading on the alternator, operation of a compressor for an air conditioning system or a change in combustion properties of the engine fuel. Additionally, other loads that may cause a change in the output speed of the automatic transmission may act on the rest of the vehicle or drive wheels. These loads may include, but are not limited to changes in aerodynamic load on the vehicle, change in topography of the road surface or towing of a trailer. Therefore, it is desirable that the maximum output torque and power that engine 12 is capable of producing be determined for purposes of determining if an up-shift is desirable. In the powertrain system 12, shown in FIG. 1, the transmission controller 20 determines the maximum torque value, based on the current operating conditions of the engine.

Controller 20 also monitors the output of the automatic transmission 18. Controller 20 preferably detects the rotational speed of the output of the transmission, using a method well known in the art.

While vehicle 10 is operating in a cruise mode, controller 20, controls the changing of gear ratios of the automatic transmission 18, i.e. shifting. As is well known, a transmission transmits the power and torque that is transmitted from an engine to the drive wheels by use of predetermined gear ratios, which function within a predetermined operating range.

Figure 2A:
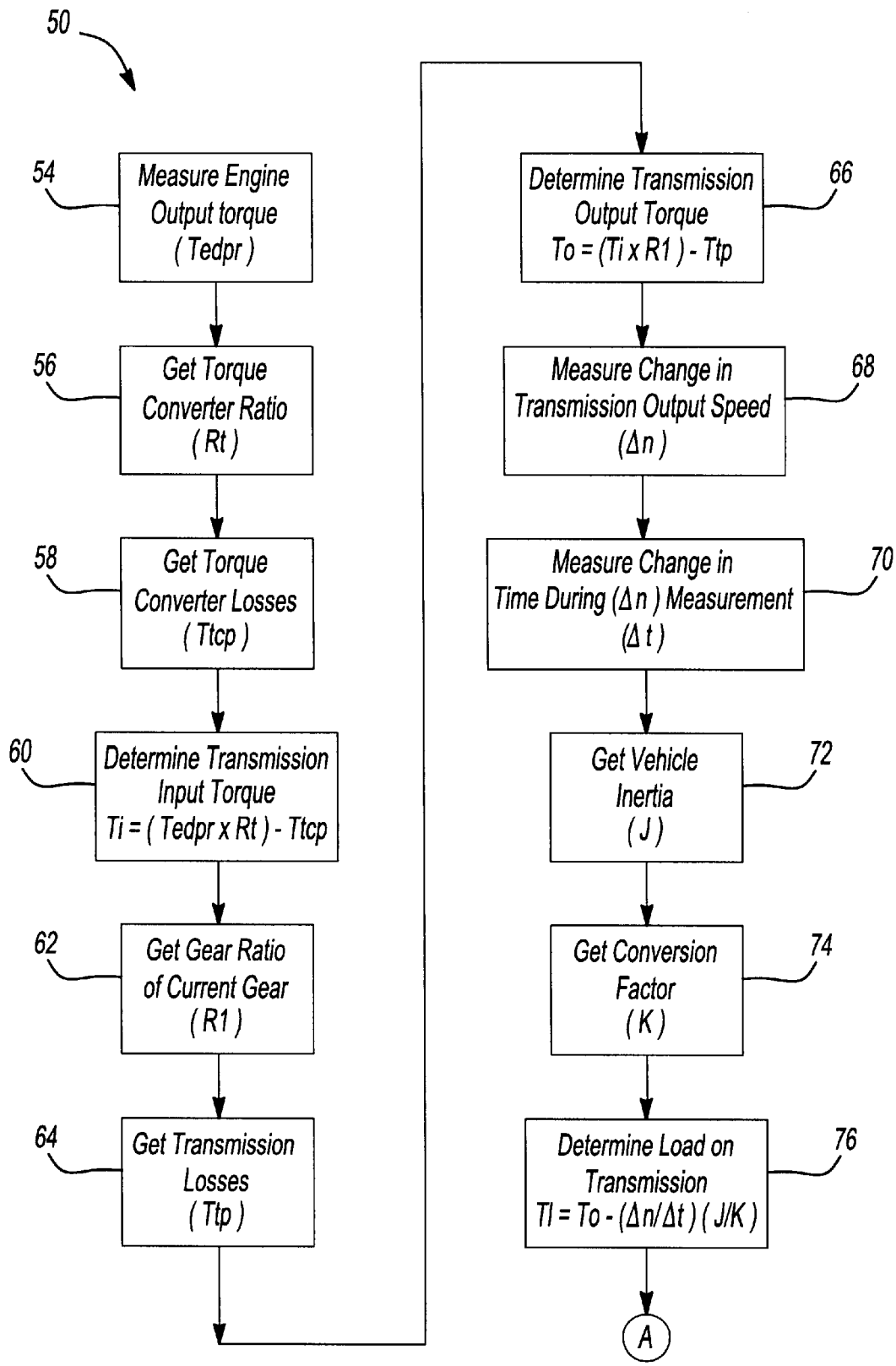
FIGS. 2A and 2B are flow diagrams which illustrate a methodology for controlling the gear selection of an automatic transmission according to the principles of the present invention.
Figure 2B:
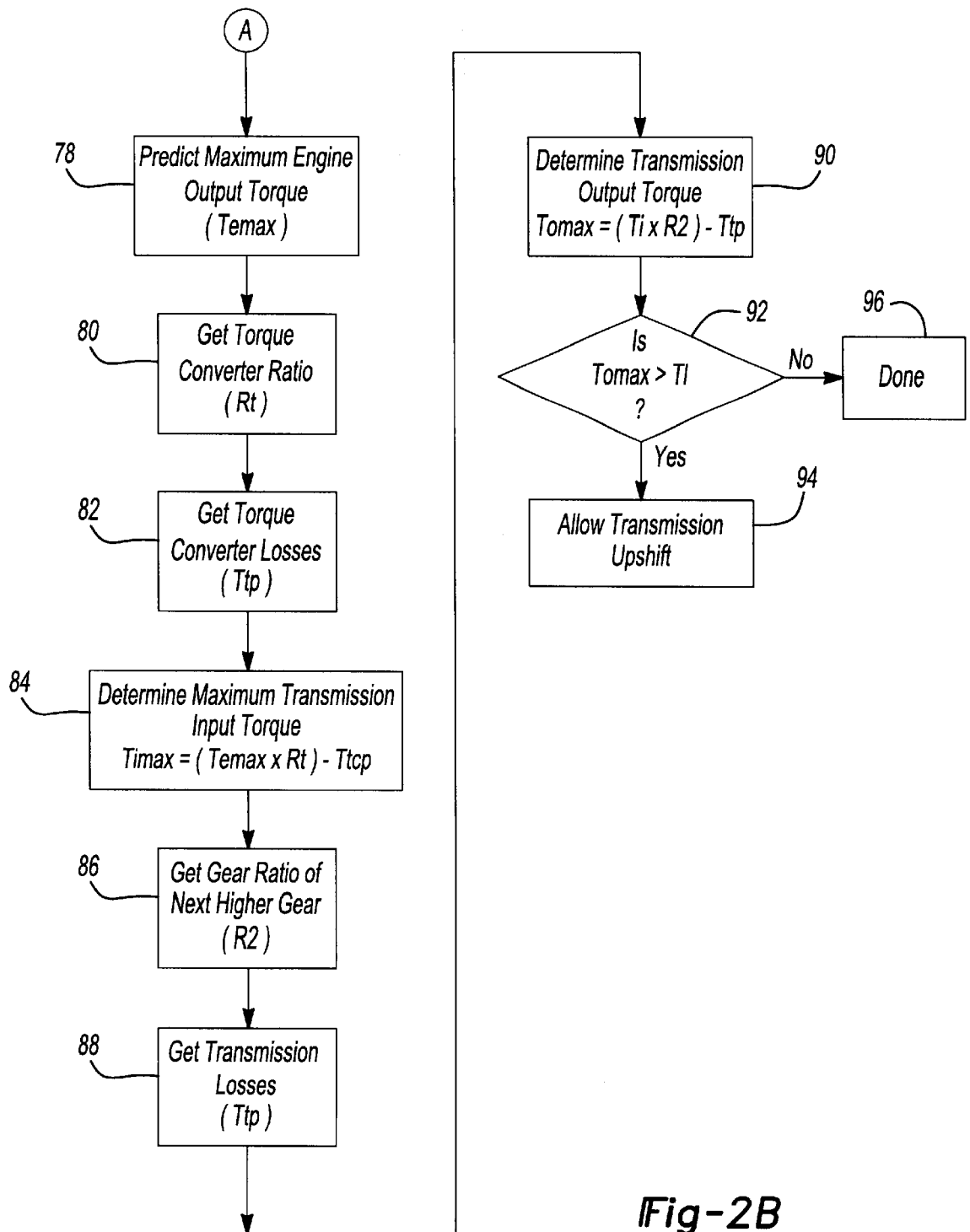

Controller 20 operatively selects the optimal gear and associated gear ratio for automatic transmission 18 using the methodology 50 shown in FIGS. 2A and 2B. It is preferred that methodology 50 includes the steps shown in FIGS. 2A and 2B. However, it is conceivable that fewer or more steps may be employed and not depart from the scope of the present invention. Methodology 50 starts at Step 54.

In Step 54, the Engine Output Torque (Tedpr) is determined. In the preferred embodiment, the Engine Output Torque (Tedpr) is provided directly from the engine controller 21 by a signal that represents the Engine Output Torque (Tedpr) on a real-time basis. The engine output torque signal is measured from the powertrain controller. However, it is also understood that the Engine Output Torque (Tedpr) may be determined many different ways and transferred using many different devices. Once the Engine Output Torque (Tedpr) is determined, the methodology proceeds to Step 56.

In Step 56, the Ratio of the Torque Converter (Rt) is determined. The ratio of the torque converter (Rt) is the ratio of the torque that is released by the torque converter compared to torque that is applied to the torque converter. As is well known, the torque converter can increase the torque into the transmission when accelerating from a stop. Modern torque converters can multiply the torque of the engine by as much as two to three times. This effect only happens when the engine is turning much faster than the transmission input. At higher speeds, the transmission input catches up to the engine, eventually moving at almost the same speed. The ratio of the torque converter is determined by the physical characteristics of the impeller, stator and turbine.

The next step in methodology 50 is Step 58. In Step 58, the parasitic losses in the torque converter (Ttcp) are determined. As is well known, any mechanical device has inherent losses due to friction, tolerances, etc. These losses affect the overall efficiency of the device. In a torque converter, the losses affect the amount of power and torque that is transferred from the engine to the transmission. The parasitic losses of the torque converter (Ttcp) are based on efficiency of torque transmittal via fluid flow and mechanical losses due to friction of moving components.

The next step in methodology 50, Step 60, determines the amount of torque input to the transmission (Ti). The torque input to the transmission (Ti) represents the amount of torque, accounting for losses from the torque converter that is inputted to the automatic transmission 18 for use by the transmission for selectively driving the drive wheels in a plurality of gears and associated gear ratios. Step 60 determines the torque input to the transmission (Ti) using the following equation:

$$Ti = (Tedpr \times Rt) - Ttcp$$

The next step in methodology 50, Step 62, determines the gear ratio of the transmission (R1). The gear ratio (R1) of the transmission, determines the ratio of revolutions of input to each revolution of output of the transmission per the geartrain of the automatic transmission 18.

The next step in methodology 50 is Step 64. In Step 64, the parasitic losses in the transmission (Ttp) are determined. As stated above, any mechanical device has inherent losses due to friction, tolerances, etc. These losses affect the efficiency of the device. In an automatic transmission, the losses affect the amount of power and torque that is transferred from the torque converter to the driving wheels 24. The parasitic losses of the transmission (Ttp) are based on frictional losses of moving components and internal parasitics, such as hydraulic pump.

The next step in methodology 50, Step 66, determines the amount of torque output from the transmission (To). The torque output from the transmission (To) represents the amount of torque, accounting for losses from the transmission that is inputted to the differential and drives drive wheels 24. The torque output of the transmission is determined utilizing the torque input (Ti) (as calculated above) the gear ratio (R1) of the current gear that the transmission 18 is operating in, and the parasitic losses of the transmission (Ttp). Step 66 determines the torque output to the transmission, To, using the following equation:

$$To = (Ti \times R1) - Ttp$$

Next, Step 68 measures the change in the output speed of the automatic transmission 18 in revolutions per minute. It is preferred that the change in the transmission output speed be measured using a sensor mounted to the output shaft of the transmission. However, it is understood that other methods of determining the change in the output speed of the transmission may be utilized.

The next step in methodology 50, Step 70, measures the time over which the change in engine output speed of the automatic transmission 18 was determined in Step 68. The measurement of the time in Step 70 will allow the rate of change of the output of the transmission to be determined.

Next, Step 72 determines the inertia of the vehicle (J). The inertia of the vehicle (J), is simply the resistance of the vehicle to change in motion. The inertia of the vehicle (J) is determined by multiplying the mass of the vehicle and the square of the rolling ratios of the drive wheels 24 and dividing by the square of the final drive ratio. The inertia of the vehicle (J) is useful for determining the amount of energy that must be utilized to keep a vehicle that is already moving in a direction continually moving in that direction.

The next step of methodology 50, Step 74, utilizes a conversion factor K to be utilized to calculate the load on the transmission in Step 76. The conversion factor K, has a standard value of $30/\pi$.

In Step 76, the adaptive load on the transmission (Tl) is determined. The adaptive load on the transmission (Tl) represents the actual amount of torque from the transmission that is required to drive the vehicle at a constant speed given the current loads, as determined above. The adaptive load on the transmission (Tl) is calculated in Step 76 utilizing the following equation:

$$Tl = To - \frac{\Delta n}{\Delta t} \times \frac{J}{K}$$

The torque output from the transmission (To), as stated above, represents the amount of torque that is outputted from the transmission after accounting for losses in the transmission and the torque converter. The torque output from the transmission is decreased by a second term $(\Delta n/\Delta t)(J/K)$ to determine the amount of adaptive torque (Tl), the torque that would actually be utilized by the differential and drive wheels to operate at a constant speed. The second term, as stated above, is composed of the change in the speed of the output of the transmission ($\Delta n$), the change in time ($\Delta t$) the change in output speed of the transmission ($\Delta n$) is determined, the inertia of the vehicle (J), and a conversion factor (K) to convert the change in the output speed of the transmission to match the units of the torque.

Following Step 76, methodology 50 continues in FIG. 2B at Step 78. In Step 78, the Maximum Engine Output Torque (Temax) is determined. In the preferred embodiment, the Maximum Engine Output Torque (Temax) is provided directly from the engine controller 21 by a signal that represents the Maximum Engine Output Torque (Temax) over the entire engine operating range on a real-time basis. As is well known in the art, the torque of an internal combustion engine varies depending on the speed of the engine. At lower engine speeds, the amount of torque produced by the engine increases with respect to the speed of the engine. However, the torque of the engine eventually reaches a maximum value prior to a maximum engine speed, whereafter the torque decreases as the speed of the engine continues to increase. The Maximum Engine Output Torque (Temax) is determined based on this scenario. In a preferred embodiment, the Maximum Engine Output Torque (Temax) is gathered from the powertrain controller. However, it is also understood that the Maximum Engine Output Torque (Temax) may be determined in many different ways and transferred using many different devices. Once the Maximum Engine Output Torque (Temax) is determined, the methodology proceeds to Step 80.

In Step 80, the Ratio of the Torque Converter (Rt) is determined. The ratio of the torque converter (Rt) as stated above, is the ratio of the torque that is released by the torque converter compared to torque that is applied to the torque converter. The ratio of the torque converter depends on the variation in speed of the engine and the transmission. The ratio of the torque converter (Rt) is determined by the physical characteristics of the impeller, stator and turbine.

The next step in methodology 50 is Step 82. In Step 82, the parasitic losses in the torque converter (Ttcp) are determined for one gear higher than the current gear of the automatic transmission. As is well known, any mechanical device has inherent losses due to friction, tolerances, etc. These losses affect efficiency of the device. In a torque converter, the losses affect the amount of power and torque that is transferred from the engine to the transmission. The parasitic losses of the torque converter, Ttcp, are determined based on efficiency of torque transmittal via fluid flow and mechanical losses due to friction of moving components.

The next step in methodology 50, Step 84, determines the Maximum Torque Input to the Transmission (Timax). The torque input to the transmission (Ti) represents the maximum amount of torque based on the Maximum Engine Output Torque (Temax) determined in Step 78, torque converter ratio ($R_t$) determined in Step 80, and accounting for losses from the torque converter 16 that is inputted to the automatic transmission 18 for use by the transmission for selectively driving the drive wheels in a plurality of gears and associated gear ratios. Step 84 determines the Maximum Torque Input to the Transmission (Timax) using the following equation:

$$Timax = Temax \times Rt - Ttcp$$

The next step in methodology 50, Step 86, determines the gear ratio to the transmission in the gear one higher than the current gear of the automatic transmission (R2). The gear ratio (R2) of the transmission, determines the ratio of revolutions of input to each revolution of output of the transmission per the gear train of the automatic transmission 18.

The next step in methodology 50 is Step 88. In Step 88, the parasitic losses in the transmission (Ttp) are determined for one gear higher than the current gear of the automatic transmission. As stated above, any mechanical device has inherent losses due to friction, tolerances, etc. These losses affect efficiency of the device. In an automatic transmission, the losses affect the amount of power and torque that is transferred from the torque converter 16 to the driving wheels 24. The parasitic losses of the transmission (Ttp) are determined based on frictional losses of moving components and internal parasitics such as hydraulic pump.

The next step in methodology 50, Step 90, determines the Maximum Torque Output from the transmission (Tomax). The Maximum Torque Output from the transmission (Tomax) represents the amount of torque, based on the Maximum Transmission Input Torque (Timax) determined in Step 84 and accounting for losses from the transmission that is inputted to the differential and drives drive wheels 24. The Maximum Torque Output (Tomax) of the transmission is determined utilizing the torque input (Timax) (as calculated above), the gear ratio (R2) of the next higher gear than the transmission 18 is currently operating in, and the parasitic losses of the transmission (Ttp). Step 90 determines the torque output to the transmission (To) using the following equation:

$$Tomax = Timax \times R2 - Ttp$$

As stated above, operating a transmission in the highest gear and associated gear ratio while still providing the required amount of torque is highly desirable. Therefore, a methodology that determines when an upshift is possible is also desirable. In Step 92 of methodology 50, it is determined if the criteria has been met to allow the automatic transmission to up-shift to the next higher gear. Step 92 determines if the Maximum Transmission Output Torque (Tomax) is greater than the Adaptive Torque load on the transmission (Tl). Basically, it is determined if the output torque (Tomax), as calculated for the gear above the current gear, is larger than the amount of torque that is required to operate the vehicle at constant speed, given the current conditions. If the result to Step 92 is YES, then the methodology proceeds to Step 94. In Step 94 the automatic transmission is shifted up one gear and one associated gear ratio.

If the result of Step 92 is NO, indicating that the Maximum Output Torque (Tomax) in the next higher gear is not greater than the Adaptive Load on the Transmission (Tl) an up-shift of the transmission is not allowed and the methodology proceeds to Step 96. Step 96 indicates the end of methodology 50.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling an automatic transmission of a motor vehicle operating in an automatic speed control mode, the motor vehicle including an engine coupled to the transmission, the transmission operative in a plurality of gear configurations for driving at least one drive wheel, the method comprising the steps of:

determining a torque output of the engine;

determining a torque load acting on the transmission in a predetermined first gear ratio based on the determined torque output of the engine;

predicting a maximum torque capable of being produced by the engine;

determining a torque output of the transmission in a predetermined second gear ratio based on the predicted maximum torque capable of being produced by the engine; and shifting the transmission from the predetermined first gear ratio to the predetermined second gear ratio if the determined torque output of the transmission in a predetermined second gear ratio is greater than the determined torque load acting on the transmission in the predetermined first gear ratio.

2. The method of controlling an automatic transmission of claim 1 wherein the step of determining the torque load acting on the transmission in a predetermined first gear ratio includes the steps of;

determining the transmission output torque in a predetermined first gear ratio at a first period of time;

determining the difference in transmission output torque from the transmission at a second period of time as compared to the first period of time; and calculating the actual torque load on the transmission at the second period of time based on the transmission output torque in a predetermined first gear ratio at a first period of time and the change in transmission output torque from the transmission at a second period of time as compared to the first period of time.

3. The method of controlling an automatic transmission of claim 2 wherein the step of determining the transmission output torque in a predetermined first gear ratio at a first period of time includes the steps of:

determining a transmission gear ratio;

determining transmission losses; and calculating the transmission input torque at a first period of time based on the transmission gear ratio, transmission losses, and torque output of the engine.

4. The method of controlling an automatic transmission of claim 2 wherein the step of determining the torque load acting on the transmission in a first predetermined gear ratio further includes the steps of:

determining a rate of change of speed of the output of the transmission;

determining a vehicle inertia; and calculating the torque load acting on the transmission based on the rate of change of speed of the output of the transmission, and the determined vehicle inertia.

5. The method of controlling an automatic transmission of claim 4 wherein the step of determining a torque output of the transmission in a predetermined second gear ratio includes the step of:

calculating the transmission torque output in a second gear based on a torque converter ratio, torque converter losses, and the predicted maximum torque capable of being produced by the engine.

* * * * *